United States Patent [19]

Grundland

[11] 4,358,694
[45] Nov. 9, 1982

[54] SELECTABLY POSITIONABLE ROTARY TRANSDUCERS

[76] Inventor: Nathan Grundland, 6 Alkalai St., Rehovot, Israel

[21] Appl. No.: 178,615

[22] Filed: Aug. 15, 1980

[30] Foreign Application Priority Data

Aug. 15, 1979 [IL] Israel ........................................ 58057
Sep. 2, 1979 [IL] Israel ........................................ 58157

[51] Int. Cl.³ ........................... H02K 24/00; B41J 1/60
[52] U.S. Cl. ................................ 310/49 R; 310/67 R;
310/156; 101/110; 101/93.22; 400/144.2;
318/659
[58] Field of Search ................. 310/49, 67, 112, 40 R,
310/40 MM, 115, 114, 116, 156; 318/685, 696,
659, 660, 661; 101/110, 95, 96, 93.11, 93.21,
93.22; 400/144.2

[56] References Cited

U.S. PATENT DOCUMENTS

| | | | |
|---|---|---|---|
| 2,736,827 | 2/1956 | Buchmann | 310/156 |
| 3,350,709 | 10/1967 | Pursiano et al. | 310/49 R |
| 3,470,509 | 9/1969 | Silverman et al. | 310/49 R |
| 4,137,491 | 1/1979 | Bartley et al. | 318/685 |

FOREIGN PATENT DOCUMENTS 54-99910  8/1979  Japan .................... 310/67 R

OTHER PUBLICATIONS

EEN: "AC Stepping Motors for Incremental Control", H. Hays, *Electronic Equipment News,* vol. 12, No. 10, Jan. 71, pp. 10–18.
IBM: Branson et al., "Character Wheel for Low-Cost Changeable Font Printer", IBM Tech. Disclosure Bull., vol. 16, No. 5, Oct. '73, p. 1515.

*Primary Examiner*—A. T. Grimley
*Assistant Examiner*—D. L. Rebsch
*Attorney, Agent, or Firm*—Sandler & Greenblum

[57] ABSTRACT

A selectably positionable rotary transducer including a first member having at least one permanent magnet associated therewith and a second member arranged for rotational motion relative to the first member in a first plane, the second member defining an odd number of poles and associated apparatus for selectively providing a magnetic force of selected polarities to individual ones of the poles to cause the first member to assume selectable positions with respect to the second member. Numbering apparatus preferably having an odd number of poles is also described.

22 Claims, 14 Drawing Figures

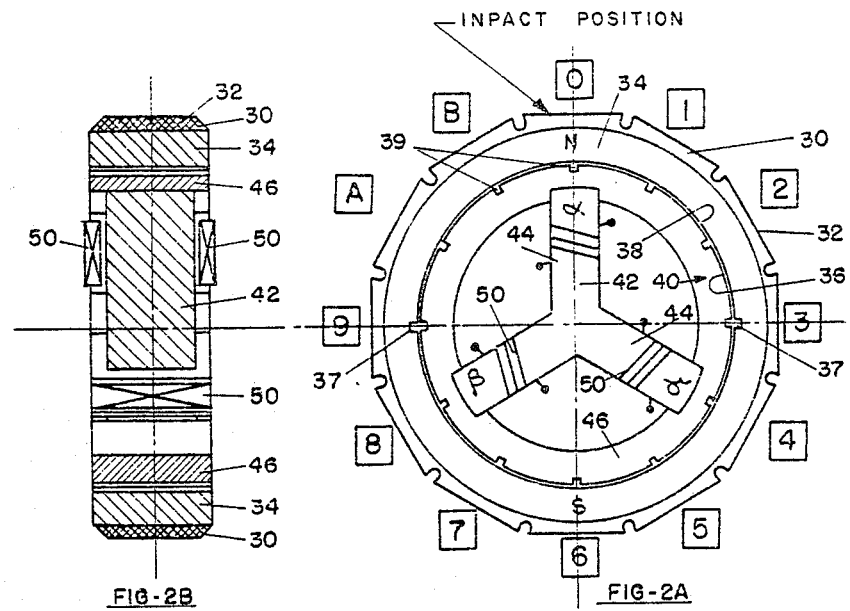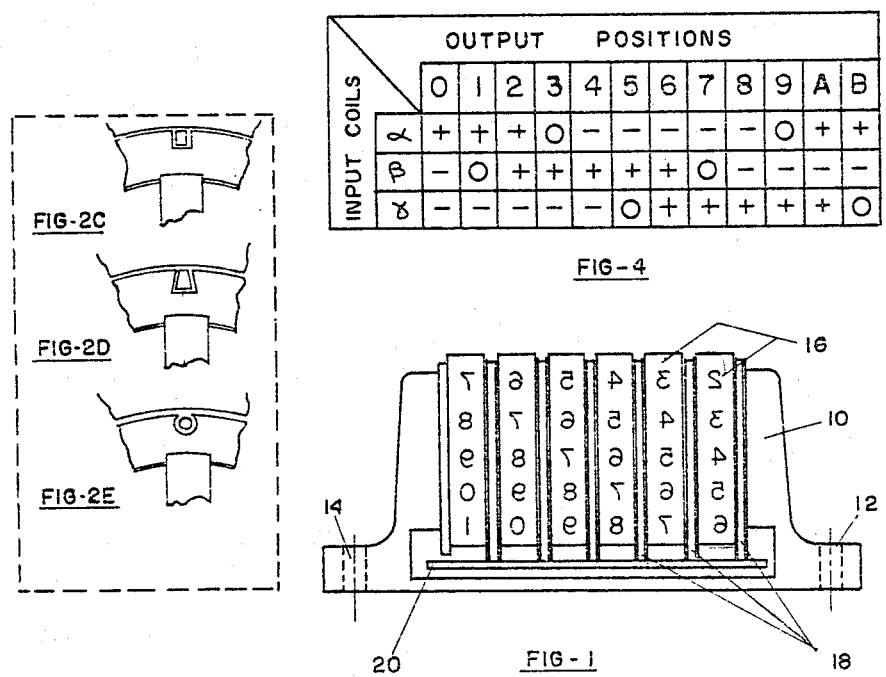

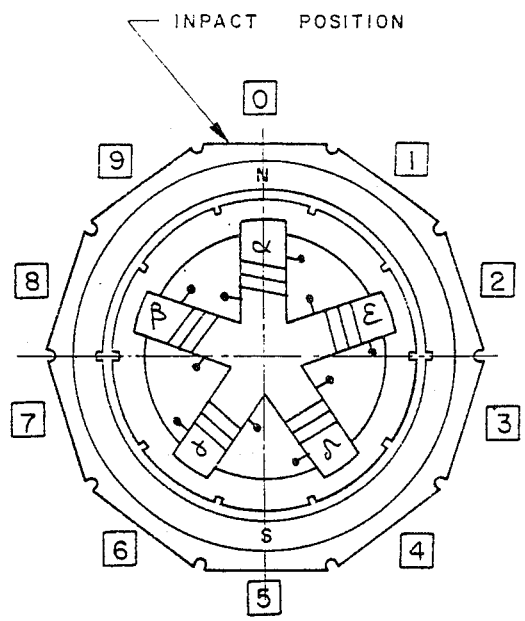
FIG-5
FIG-3
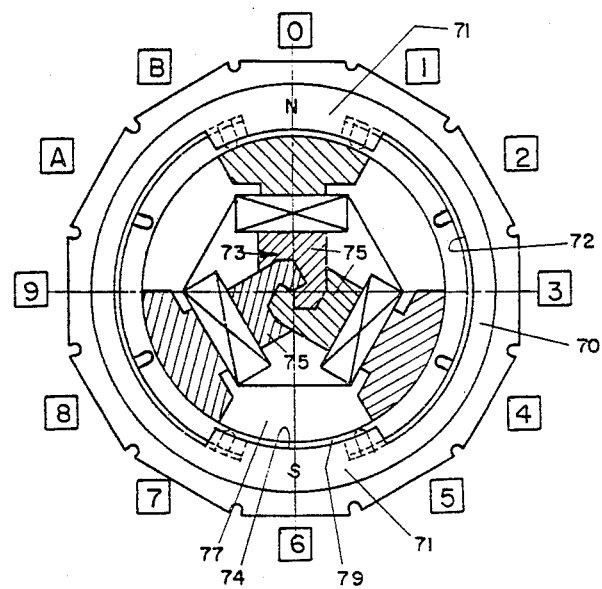
FIG-8
FIG-6

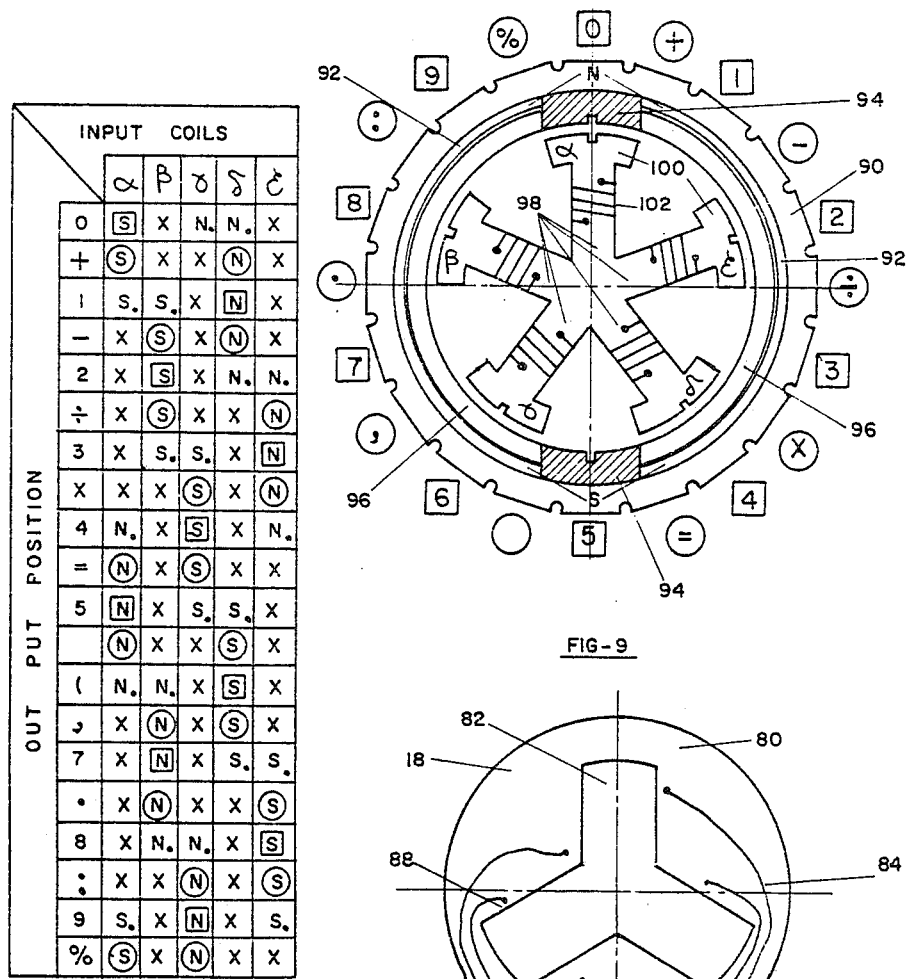
FIG-9
| OUT PUT POSITION | INPUT COILS | | | | |
|---|---|---|---|---|---|
| | α | β | γ | δ | ε |
| 0 | Ⓢ | X | N. | N. | X |
| + | Ⓢ | X | X | Ⓝ | X |
| 1 | S. | S. | X | Ⓝ | X |
| − | X | Ⓢ | X | Ⓝ | X |
| 2 | X | Ⓢ | X | N. | N. |
| ÷ | X | Ⓢ | X | X | Ⓝ |
| 3 | X | S. | S. | X | Ⓝ |
| X | X | X | Ⓢ | X | Ⓝ |
| 4 | N. | X | Ⓢ | X | N. |
| = | Ⓝ | X | Ⓢ | X | X |
| 5 | Ⓝ | X | S. | S. | X |
| ( | Ⓝ | X | X | Ⓢ | X |
| ) | N. | N. | X | Ⓢ | X |
| , | X | Ⓝ | X | Ⓢ | X |
| 7 | X | Ⓝ | X | S. | S. |
| . | X | Ⓝ | X | X | Ⓢ |
| 8 | X | N. | N. | X | Ⓢ |
| : | X | X | Ⓝ | X | Ⓢ |
| 9 | S. | X | Ⓝ | X | S. |
| % | Ⓢ | X | Ⓝ | X | X |
FIG-10
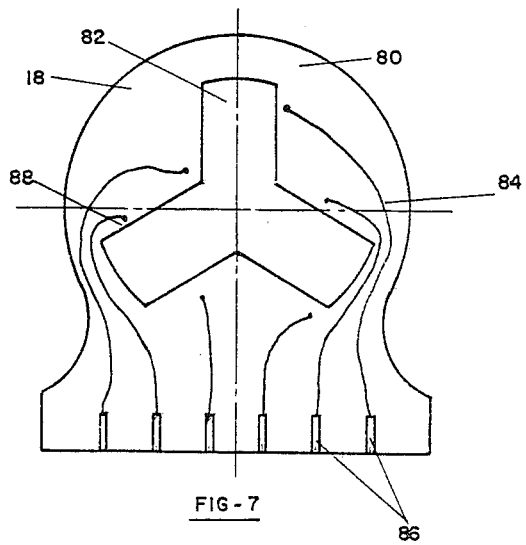
FIG-7

SELECTABLY POSITIONABLE ROTARY TRANSDUCERS

FIELD OF THE INVENTION

The present invention relates to rotary transducers and more particularly to selectably rotatably positionable elements useful in printing applications such as numbering.

BACKGROUND OF THE INVENTION

Various types of rotary transducers are known for a variety of applications including printing. Such transducers are also known as stepping motors for a wide variety of functions. In general, electromagnetically operated rotary transducers comprise an even number of poles. Most rotary transducers, however, particularly those used in printing and numbering applications are mechanically operated.

Various types of numbering apparatus are known in the printing art. These are mechanical devices and are operative mainly for sequential numbering of documents being printed. Particular printing wheels are available for such apparatus for printing predetermined sequences of numbers or skipping predetermined numbers, but these also operate only in a predetermined order, since each wheel is rotated by an adjacent wheel.

Examples of conventional mechanical numbering apparatus can be seen in the catalogs of Zeiser K. G. of Bogenstrasse 6-8, Emmingen 1-W. Germany and Atlantic Numbering Machine Corporation of 1333-60th Street Brooklyn New York, U.S. Numbering apparatus of this type suffers from the disadvantages arising of its limitation to fixed order stepwise operation. Among these disadvantages are the requirement that a mechanical trigger be provided in association with the printing apparatus for operating the stepping cam of the numbering apparatus. Difficulties arise in initial set up of the numbering apparatus to a selected non-zero starting number or in resetting the numbering apparatus in the event that some numbered sheets in the middle of the sequence become spoiled and must be reprinted. Both of these operations involve the waste of considerable time in the use of conventional numbering apparatus.

Using conventional numbering apparatus there is no possibility of providing random number printing or printing of random check digits. A further disadvantage is that using conventional numbering apparatus a printing establishment must maintain a stock of a large number of printing wheels to suit particular predetermined sequences of numbers or symbols as well as spare parts for the mechanical portions of the apparatus which are subject to wear.

Numbering wheels and cylinders are also known in desk-top calculators. These generally fall within two groups, one in which the digits are printed by individual hammer action, for example, rather than in a single hammer action and the other in which slow pre-positioning and alignment of the digits take place by mechanical action and printing occurs simultaneously therewith. The functions characteristic of both groups render this type of printing wheel unsuitable for general printing use. In addition, such numbering wheels, notwithstanding their capability, in principle, for random numbering, are too slow and not sufficiently accurate in positioning for general printing use.

SUMMARY OF THE INVENTION

The present invention seeks to overcome disadvantages of prior art selectably positionable rotary transducers and to provide a selectably positionable rotary transducer which is suitable inter alia for printing applications and which overcomes the speed and accuracy limitations of prior art apparatus.

There is thus provided in accordance with the present invention a selectably positionable rotary transducer comprising a ring member having at least one permanent magnet associated therewith and a second member arranged for rotational motion relative to the ring member in a first plane, the second member defining an odd number of poles and associated apparatus for selectably providing a magnetic force of selected polarity at the poles thereby to cause the ring member to assume selectable positions.

Further in accordance with an embodiment of the invention, the ring member may have a generally circular outer surface having formed thereon predetermined symbols at selected positions therealong.

Additionally in accordance with an embodiment of the invention the ring member and the second member should have low friction engaging surfaces. The engaging surfaces may additionally be configured to enhance concentration of the electromagnetic forces produced for enhanced accuracy of positioning.

Selected positions of the ring member may be realized by energizing the various poles in a selectable combinations of different polarities.

While the printing apparatus preferably is formed with an odd number of poles, it may also be constructed with an even number of poles.

The invention will be more fully understood and appreciated from the following detailed description taken in conjunction with the drawings in which:

FIG. 1 is a general pictorial view of a numbering device constructed and operative in accordance with an embodiment of the invention;

FIGS. 2A-2E are respective plan and sectional views of a printing wheel forming part of the apparatus of FIG. 1 and alternative versions of a portion thereof;

FIG. 3 is a plan view illustration of an alternative embodiment of a printing wheel useful in the embodiment of FIG. 1;

FIG. 4 is a table illustrating the relationship between coil energization polarity and printing position for the embodiment of FIGS. 2A and 2B;

FIG. 5 is a table illustrating the relationship between coil energization polarity and printing position for the embodiment of FIG. 3;

FIG. 6 is a plan view illustration of another alternative embodiment of a printing wheel useful in the embodiment of FIG. 1;

FIG. 7 is a plan view of a printed circuit containing mounting spacer useful in the embodiment of FIG. 1;

FIG. 8 is a table illustrating the relationship between coil energization polarity and printing position for the embodiment of FIG. 6;

FIG. 9 is a plan view illustration of a further alternative embodiment of a printing wheel useful in the embodiment of FIG. 1; and FIG. 10 is a table illustrating the relationship between coil energization polarity and printing position for the embodiment of FIG. 9.

For reasons of conciseness, the present invention will be described hereinafter in the context of numbering apparatus, it being appreciated that the invention is not limited to numbering apparatus but is applicable equally to any suitable type of selectably positionable rotary transducer.

Reference is now made to FIG. 1 which is a pictorial view of a numbering device constructed and operative in accordance with an embodiment of the present invention and which comprises a housing 10 including mounting holes 12 and 14. A selectable number of printing wheels 16, typically 6 in number, is rotatably mounted in housing 10. Disposed between each printing wheel is a printed circuit mounting spacer 18. There is provided an electrical connection between spacers 18 and a printed circuit board 20 which may contain switching, logic or other suitable circuitry and which may in turn be connected to a keyboard, computer or any other suitable control for determining which numbers or other symbols are to be printed. According to an alternative embodiment of the invention, the logic or other circuitry need not necessarily be embodied in circuit board 20.

It may be appreciated readily that any desired numbers or other indicia may be formed preferably on the outer peripheral surface of printing wheels 16, as illustrated, and alternatively on any other suitable surface of the printing wheels. The numbers or other indicia may provide any desired function, such as a printing or punching function or any other desired operation.

Referring now to FIGS. 2A and 2B, the structure of the printing wheels 16 and associated assemblies will now be described. Generally speaking, the printing wheel 16 comprises a static inner portion and a rotatably moving outer portion. The outer portion comprises a generally ring-like element 30, which may be formed of metal or of any other suitable material and has formed at desired locations along the peripheral surface 32 thereof indicia such as numbers or symbols. In the illustrated example, there are provided the numbers 0-9 and symbols represented by the letters A and B, i.e. twelve symbols in all.

Fixedly disposed within element 30 is a magnet 34 formed in the shape of a ring and which may be press fit within element 30. Magnet 34 is typically bipolar as indicated. Alternatively, a multipolar magnet may be employed, care being taken that no position ambiguity is created in the use thereof. Magnet 34 is formed preferably with a smoothed inner wear surface 36 which is arranged for appropriate relatively low friction rotation against the outer surface 38 of a fixed stator 40. A friction reducing material such as Teflon or oil may be employed to reduce the friction between magnet 34 and stator 40 but without significantly interfering with the magnetic fields therebetween or with the existence of an air gap between the facing circumferences of the two members.

The inner wear surface 36 of magnet 34 may be formed with a pair of slots 37, evenly dividing the magnet 34 for better definition of the magnetic fields produced thereby.

Stator 40 is fixed with respect to the housing 10 and comprises a multi-pole core 42 formed in the shape of spokes 44 terminating in a connecting ring 46 which may be press fit thereonto. Connecting ring 46 may be made of any suitable material such as soft-iron and joins the spokes 44. Connecting ring 46 may be coated, other than on surface 38, with a flux barrier material.

According to a preferred embodiment of the present invention, the outer surface 38 of the connecting ring 46 may be formed with twelve equally spaced slots 39, typically of the same width as slots 37.

Alternative configurations of slots 39 may be seen in FIGS. 2C, 2D, and 2E, which illustrate respective rectangular, trapezoidal and rounded slots.

According to a preferred embodiment of the present invention an odd number of poles is provided. In the illustrated version, three poles, designated by the Greek letters $\alpha$, $\beta$ and $\gamma$ are provided. Electrical coils 50 are wound about each of spokes 44, each of which corresponds to a pole. The coils are electrically connected to the printed circuit spacers 18 as will be described hereinafter.

Considering briefly the operation of the embodiment of FIGS. 2A and 2B, it can be appreciated that position 0 is placed at the impact location by energizing pole $\alpha$ positively (South), or by energizing poles $\beta$ and $\gamma$ negatively (North) or by both. Position 1 is placed at the impact location by energizing pole $\alpha$ positively, pole $\gamma$ negatively and deenergizing pole $\beta$. Similarly all of the twelve positions on the printing ring may be located at the impact location by suitable combinations of energizations of poles $\alpha$, $\beta$ and $\gamma$.

The combinations required for printing the symbols apprearing in FIG. 2A are indicated in the table of FIG. 4, where + indicates positive polarity, — indicates negative polarity and 0 indicates deenergization. It may be appreciated that the magnet and pole polarities may be reversed.

It is appreciated that certain of the positions require energization of only one pole while others require energization of more than one pole. In order to maintain uniform performance characteristics, it is recommended that two poles be energized in every case.

Desired positioning of the printing wheel is achieved by electronically switching the magnetic fields on the poles, possibly sequentially, through configurations corresponding to intermediate positions until the impact position is reached. It is noted that although the term "impact location" is employed, impact need not necessarily be involved in operation of the apparatus.

Reference is now made to FIG. 3 which shows a printing ring and stator assembly generally similar to that described hereinabove in connection with FIGS. 2A and 2B. The difference here is that there are provided five poles instead of three.

The provision of five poles has the functional advantage that a total of ten symbols, such as the numerals 0–9 may be selected by energizing only one pole at a time. It is apppreciated that alternative or additional poles may be energized and many additional intermediate positions can be realized, subject only to limitations of accuracy in positioning by energization of combinations of poles.

Reference is made to FIG. 5 which shows a table, similar in organization to the table of FIG. 4, showing what individual pole must be energized in what polarity to attain a predetermined position. The poles are indicated by the Greek letters $\alpha$, $\beta$, $\gamma$, $\delta$, and $\epsilon$, the polarities are indicated by + and — and a circle surrounding the polarity indication denotes that energization of such pole would be sufficient. The poles may also be energized in the combination indicated or perhaps in another combination.

Reference is now made to FIG. 6 which is generally similar to the embodiment of FIG. 2A except in the following respects. Here, instead of a generally ring-shaped magnet, there is provided a ring magnet 70 having a pair of poles 71, labeled N and S, extending inwardly. Disposed alongside the interior surface 72 of the ring magnet between the poles are a plurality of low friction support nodes, typically formed as beads of Teflon, which support the magnet on the stator.

The stator 73 here comprises a plurality of interlocking spokes 75, each wound with an electrical coil and terminating in an enlarged head of approximately the same circumference as that of the poles. In the illustrated embodiment, wherein three stator poles are provided with two rotor poles, the circumference of each pole is approximately one sixth of the total circumference of the imaginary circle defined by the interior magnet surface 74. Disposed intermediate the enlarged heads of the stator are elements 77 having a curved slip surface 79 and which are arranged to define together with the outer surface of the heads a continuous circular slip surface.

Reference is now made to FIG. 8 which illustrates, in table form, the combination of energization polarities of the various spokes required to achieve each impact position. The appearance of an X indicates that the respective coil is deenergized in the indicated position.

Referring now to FIG. 7 there is seen a printed circuit mounting spacer 18 which is typically formed on an insulative substrate 80 and is formed with an aperture 82 designed to accommodate the coils 50 wound around the spokes 44, as in the illustration of FIG. 2A for example. It is noted from FIG. 2B that the coils extend slightly outward from the rest of the assembly. This extension engages apertures 82 in adjacent mounting spacers 18.

Mounting spacers 18 are formed with interior insulated electrical connections 84 which typically extend from a bottom connector 86, which may engage printed circuit board 20, to individual points adjacent the electrical connections to the individual coils.

Individual wires, typically extensions of the coils, (not shown) are typically directly connected to these points, here indicated generally by reference numeral 88.

A flux barrier may be disposed on the outer side of the mounting spacer 18 and over the aperture area 82, to reduce as much as possible, mutual flux between adjacent printing wheels.

Reference is now made to FIG. 9 which illustrates the structure of a printing ring and associated static portion constructed and operative in accordance with an alternative embodiment of the present invention, and having 20 possible printing positions on which are formed digits 0-9 and various symbols. The rotor is constructed similarly to that in FIG. 6 in that it comprises an outer portion 90. Disposed within outer portion 90 is a magnet assembly comprising curved portions 92 of magnetic material joined by two pole portions 94, which may be slotted and are typically formed of soft iron and extend inwardly of the curved portions 92. Low friction support strips 96, typically formed of or coated with Teflon are positioned between the pole portions on the curved portions 92 to provide a slip surface.

The stator is formed of five spokes 98 which terminate in enlarged heads 100 that define stator poles which may be slotted. Electrical coils 102 are wound about the spokes 98 and are connected to sources of electrical power as by the mounting spacer of FIG. 7 modified for a five pole stator. The width of each head 100 is selected to be approximately one tenth of the total circumference of the imaginary circle defined by the outer surfaces thereof, and approximately equal to the width of a pole portion 94.

It may be appreciated that selective energization of the coils on spokes 98 in a selective polarity can produce the indicated 20 positions. The combinations of coils that must be energized and their polarity is indicated for each printing position in FIG. 10. The indication of an X for a given coil indicates that the coil is not energized for a given position.

The energized poles in squares represent one set of ten symbols. Energized poles in circles represent another set of ten symbols. Poles marked with dots may or may not be energized.

It is appreciated that there are a number of significant features which characterize the present invention. One of these is the provision of an odd number of poles on the stator. This feature enables a much greater number of positions to be realized with relatively high accuracy than would be the case were an even number of poles provided. It is also appreciated that further benefits may be realized by constructing the stator to have an odd number of poles.

A second important feature of the invention lies in the fact that the bearing or slip surfaces of engagement between the rotor and the stator serve at the same time as mechanical supporting surfaces and electromagnetic gap defining surfaces. This feature enables significant economies to be realized both in size and cost of rotary transducers such as stepping motors and other apparatus, including the printing wheels described hereinabove.

It will be appreciated by persons skilled in the art that the invention is not limited to what has been shown and described hereinabove. The scope of the invention is defined by the claims which follow.

I claim:

1. A selectably positionable rotary transducer comprising a movable outer first member having at least one permanent magnet associated therewith and an inner stationary second member, said first member being arranged for rotational motion relative to said second member in a first plane, said second member defining an odd number of poles and a ring member joining said poles at their periphery to define a magnetic closed loop and associated apparatus for selectively providing a magnetic force of selected polarities, to individual ones of said poles to cause said first member to assume selectable positions with respect to said second member, said ring member lying in said first plane, and wherein said first member defines an inner facing circumferential surface and said ring member defines an outer facing circumferential surface, said inner and outer facing circumferential surfaces lying in electromagnetic and mechanical engagement to define an electromagnetic gap between said ring member and said first member and mechanical bearing surfaces for relative rotational mounting therebetween.

2. Apparatus according to claim 1 and wherein said first member has a generally ring-type configuration and lies peripherally outwardly of said second member.

3. Apparatus according to claim 1 and wherein said first member is formed with a generally circular outer surface having formed thereon predetermined indicia at selected positions therealong.

4. Apparatus according to claim 1 and wherein said at least one magnet is of generally ring shape and defines a low friction surface which is disposed for rotation against an outer surface of said second member.

5. Apparatus according to claim 1 and wherein said second member defines a low friction outer surface at its poles.

6. Apparatus according to claim 1 and wherein said at least one magnet comprises a plurality of pole portions protruding inwardly towards said second member.

7. Apparatus according to either claim 1 and wherein said at least one magnet comprises a plurality of pole portions protruding inwardly towards said second member and wherein said apparatus also comprises a plurality of low friction mounting members disposed on said at least one magnet intermediate said pole portions for providing bearing surfaces for said second member.

8. Apparatus according to claim 1 and wherein said at least one magnet is formed with indentations for concentrating the magnetic fields produced thereby.

9. Apparatus according to claim 1 and wherein said magnetic force is exerted in a radial direction.

10. Apparatus according to claim 1 and comprising a plurality of said first and second members arranged in side by side arrangement, and a plurality of circuit boards disposed intermediate adjacent second members for providing electrical energy thereto.

11. Apparatus according to claim 1 and wherein slots are defined on said inner facing circumferential surface and on said outer facing circumferential surface, the arrangement of said slots being such that desired position steps of said first member relative to said second member correspond to registration of the slots on said inner facing circumferential surfaces with some slots on said outer facing circumferential surface.

12. Apparatus according to claim 11 and wherein the number of slots on said outer facing circumferential surface exceeds the number of slots on said inner facing circumferential surface.

13. Numbering apparatus comprising:
at least one independently operable rotary printing element, having formed thereon at predetermined positions, predetermined symbols;
at least one magnet fixedly attached to said at least one printing element for movement together therewith;
a stator arranged with respect to each printing element and located interiorly thereof so as to permit low friction rotation of said printing element with respect thereto and including a plurality of poles and associated means for selectively providing a magnetic force of selected polarity at said poles in a radial direction and in a selectable combination thereby to cause said printing element to assume selected ones of said predetermined positions for printing of said predetermined symbols in response to energization of at least one of said poles, said stator also including a ring member joining said plurality of poles at their periphery to define a magnetic closed loop, said at least one printing element comprising an outer element coplanar with said ring member and defining an inner facing circumferential surface, said ring member defining an outer facing circumferential surface, said inner and outer facing circumferential surfaces lying in electromagnetic and mechanical engagement to define an electromagnetic gap between said ring member and said printing element and mechanical bearing surfaces for relative rotational mounting therebetween.

14. Apparatus according to claim 13 and wherein said at least one magnet is of generally ring shape and defines a low friction surface which is disposed for rotation against an outer surface of said stator.

15. Apparatus according to claim 13 and wherein said stator defines a low friction outer surface at its poles.

16. Apparatus according to claim 13 and wherein said stator comprises three poles.

17. Apparatus according to claim 13 and wherein said stator comprises five poles.

18. Apparatus according to claim 13 and wherein said stator comprises an odd number of poles.

19. Apparatus according to claim 13 and wherein said means for selectively providing comprises coils arranged in association with said poles for individual energization thereof.

20. Apparatus according to claim 13 and wherein said at least one magnet comprises a plurality of pole portions protruding inwardly towards said stator.

21. Apparatus according to claim 20 and also comprising a plurality of low friction mounting members disposed on said at least one magnet intermediate said pole portions for providing bearing surfaces for said stator.

22. Apparatus according to claim 13 and wherein said at least one magnet is formed with indentations for concentrating the magnetic fields produced thereby.

* * * * *